United States Patent [19]
LeConey et al.

[11] Patent Number: 6,083,305
[45] Date of Patent: Jul. 4, 2000

[54] SNAP ON DESICCANT BAG

[75] Inventors: Douglas E. LeConey, Clayton; Raymond B. Wood, Brookville, both of Ohio

[73] Assignee: Stanhope Products Company, Brookville, Ohio

[21] Appl. No.: 09/060,119

[22] Filed: Apr. 14, 1998

Related U.S. Application Data

[63] Continuation of application No. 09/013,397, Jan. 26, 1998.
[60] Provisional application No. 60/069,630, Dec. 15, 1997, and provisional application No. 60/073,825, Feb. 5, 1998.

[51] Int. Cl.$^7$ ............................................. B01D 53/04
[52] U.S. Cl. .......................... 96/147; 96/153; 55/507; 55/515; 62/476; 210/282; 210/DIG. 6
[58] Field of Search ........................... 55/505, 507, 515; 62/474, 476, 503; 96/108, 121, 133–135, 147, 153; 210/282, DIG. 6

[56] References Cited

U.S. PATENT DOCUMENTS

| | | | |
|---|---|---|---|
| 3,879,292 | 4/1975 | McClive | 210/282 |
| 4,116,649 | 9/1978 | Cullen et al. | 55/387 |
| 4,291,548 | 9/1981 | Livesay | 62/503 |
| 4,401,447 | 8/1983 | Huber | 55/387 |
| 4,405,347 | 9/1983 | Cullen et al. | 55/387 |
| 4,436,623 | 3/1984 | Cullen et al. | 210/282 |
| 4,457,843 | 7/1984 | Cullen et al. | 210/282 |
| 4,464,261 | 8/1984 | Cullen et al. | 210/282 |
| 4,474,035 | 10/1984 | Amin et al. | 62/503 |
| 4,496,378 | 1/1985 | Kish | 55/316 |
| 4,619,673 | 10/1986 | Cullen et al. | 55/387 |
| 4,911,739 | 3/1990 | Cullen et al. | 55/387 |
| 4,921,512 | 5/1990 | Maryyanek et al. | 96/133 X |
| 4,994,185 | 2/1991 | Cullen et al. | 210/282 |
| 5,036,972 | 8/1991 | Cullen et al. | 96/108 X |
| 5,177,982 | 1/1993 | Plemens | 62/503 |
| 5,569,316 | 10/1996 | Flaugher et al. | 96/135 |
| 5,580,451 | 12/1996 | Tack | 96/108 X |
| 5,636,525 | 6/1997 | Riemenschneider | 62/474 |
| 5,718,743 | 2/1998 | Donnelly et al. | 96/135 |
| 5,802,868 | 9/1998 | Riemenschneider | 96/147 X |
| 5,814,136 | 9/1998 | Wood | 96/147 |
| 5,827,359 | 10/1998 | Dobson et al. | 96/147 |
| 5,837,039 | 11/1998 | LeConey et al. | 96/121 |
| 5,865,998 | 2/1999 | Abraham et al. | 96/133 X |

*Primary Examiner*—Robert Spitzer
*Attorney, Agent, or Firm*—Biebel & French

[57] ABSTRACT

An adsorbent package is provided for mounting to a filter or bleed nipple that is, in turn, attached to a bright tube or other fluid flow conduit in an auto or truck accumulator or receiver dryer. In a preferred form of the invention, a centrally disposed opening is provided in the adsorbent package and is surrounded by a rigid collar. The aperture is dimensioned so that it will be force or snap fit over a flange or the like on a filter.

23 Claims, 11 Drawing Sheets

SNAP ON DESICCANT BAG

CROSS REFERENCE TO RELATED APPLICATIONS

The present application is a Continuation-In-Part of application Ser. No. 09/013,397 filed Jan. 26, 1998. Applicant also claims the benefit of the filing dates of U.S. Provisional Application serial No. 60/069,630 filed Dec. 15, 1997 and Provisional Application serial No. 60/073,825 filed Feb. 5, 1998.

1. FIELD OF THE INVENTION

The present application pertains to an adsorbent package adapted for use in air conditioning accumulators and receiver dryers of the type having a fluid flow line disclosed therein that is connected to a filter or bleed nipple.

2. BACKGROUND OF THE INVENTION

Adsorbent packages are typically provided in automotive accumulators and receivers to dehydrate air and refrigerants. Commonly, liquid accumulators for air conditioning systems, such as automotive air conditioning systems, employ a sealed or closed canister which provides temporary storage for the refrigerant and the lubricating oil, and also provides for dehydration of the refrigerant. Typically, the liquid accumulator has a permanently sealed casing which includes a baffle which separates the liquid from the gas component, and also has a generally u-shaped pick up tube or suction tube with a bight portion which has a filtered bleed opening facing the container bottom. The tube also has two legs which extend upwardly toward the baffle at the top in generally, but not necessarily, parallel relationship, one end of which is open to receive an inflow of vaporized refrigerant for delivery to the suction side of the compressor by downward flow past the bottom pick up opening.

One or more desiccant packages are normally carried on or mounted on this u-shaped tube with portions extending from the filtered pick up opening upwardly along the generally parallel portions of the tube extending from the bight. The desiccant package is inserted and sealed within the accumulator prior to its permanent assembly. Accumulators of this general kind are shown in the U.S. patents of Livesay, U.S. Pat. No. 4,291,548 of Sep. 29, 1981, and Kisch U.S. Pat. No. 4,496,378 of Jan. 29, 1985. In some cases, the adsorbent package is mounted directly to the filter.

There is a need in the art to provide a stable mounting of the adsorbent package so that it will not become misaligned or dislodged during use. Such actions could block the filter or result in positioning of the adsorbent packet in the sump area of the accumulator.

In many current accumulator structures, the filter is provided as part of a plastic snap on assembly wherein a mounting ring or clasp grasps the fluid flow tube to provide a mount for the filter. Due to excessive vibration during use, abrasion of the normally fibrous pouch along this ring or clasping mechanism could result in tearing or complete rupture of the package, spilling the contents of the package into the accumulator sump area.

Also worth mentioning is the need for the provision of a nesting area that extends along the adsorbent package in generally parallel relation to the bight tube of the accumulator. This nesting area helps to ensure stable mount of the adsorbent package in the accumulator.

SUMMARY OF THE INVENTION

The above noted concerns and needs are addressed by the single, unitary adsorbent package in accordance with the invention. Briefly, the adsorbent material package of the present invention comprises a sole elongated pouch like material adapted for filing with desiccant or other adsorbent medium therein. A centrally located aperture is provided in the package and is surrounded by an annularly shaped rigid zone defining a heat or ultrasonic seal of the top surface of the package with the bottom package surface to thereby form a rigid mounting zone. The package opening is force or snap fit over a flange or the like associated with the bleed filter that is in turn connected to the bight tube of the accumulator. In normal accumulator structures, the bight tube is oriented transversely with regard to the longitudinal axis of the cylindrical housing and connects upwardly extending fluid flow tubes.

A longitudinally disposed seam member is formed along the length of the top or bottom side of the adsorbent pouch. This seam includes a double fabric layer area and may be formed via conventional means such as heat sealing, ultrasonic sealing, or other electronic sealing or fusing means. This longitudinally extending zone provides a reinforced area of the pouch that is adapted for positioning adjacent a ring like mounting clamp or the like which latter structure is commonly used to detachably mount a plastic filter to the bight tube portion.

In another aspect of the invention, a pair of rigid shoulder members is formed along an intermediate portion of the unitary pouch. Each of the shoulder members extends from one of the width wise ends of the pouch towards the central opening. These rigid shoulders are generally flat and, cooperate with tucks formed along opposing sides of the unitary pouch to provide a reduced width portion of the pouch intermediate the longitudinal ends of the pouch. This reduced width portion of the pouch facilitates folding of the pouch. Additionally, when the accumulator canister is assembled, the accumulator housing will more readily slide or fit over the folded packet and this reduced or "necked-in" width dimension.

Preliminary indications find that it is best to provide an aperture diameter in the package of from about 0.8–0.9 based upon the outside diameter of the filter flange.

The invention will be further described and illustrated in conjunction with the following detailed description and appended drawings.

DETAILED DESCRIPTION OF THE PREFERRED EMBODIMENT

Figure 1:
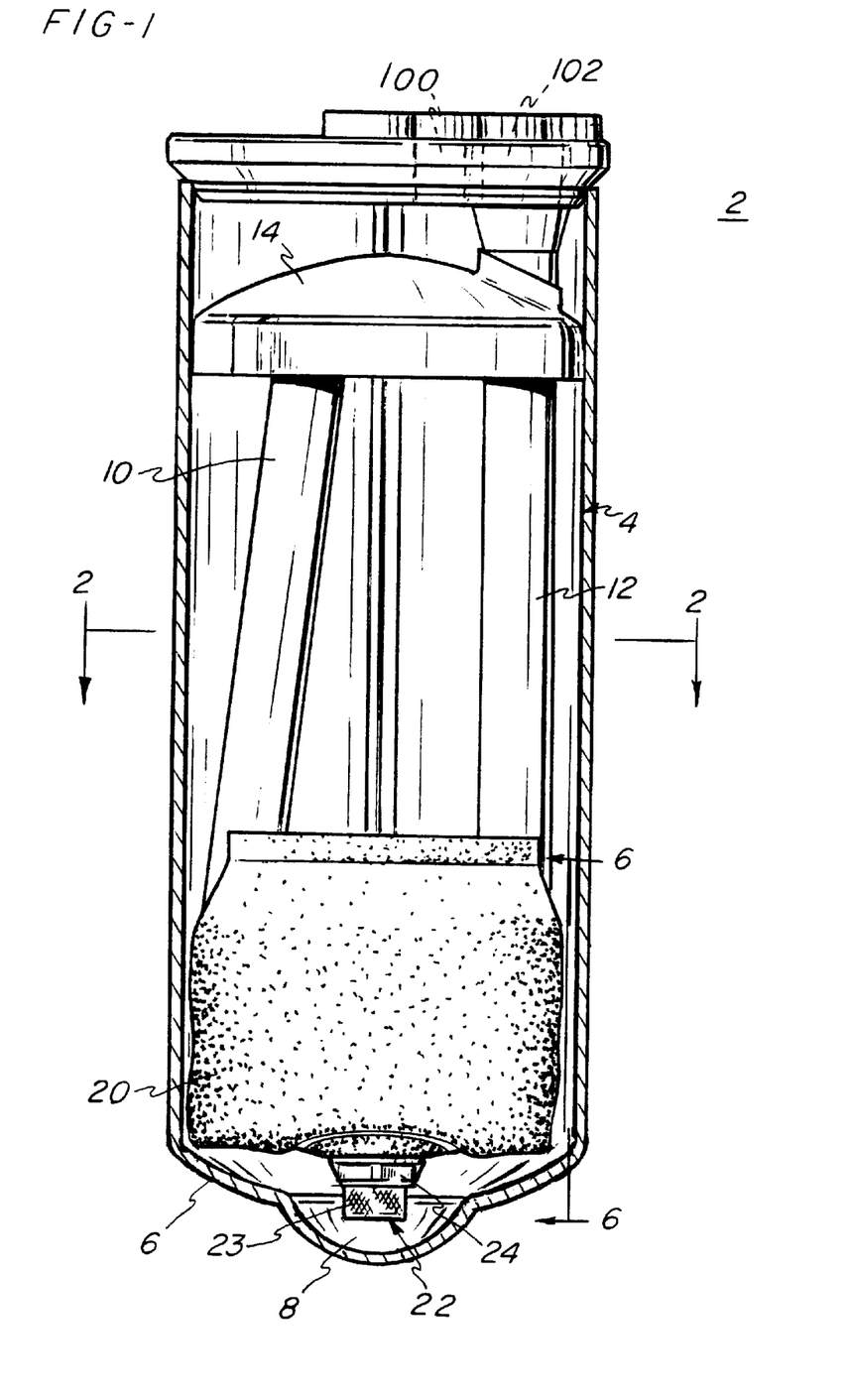
FIG. 1 is a cut away view of an accumulator incorporating a unitary adsorbent material package in accordance with the invention.
Figure 2:
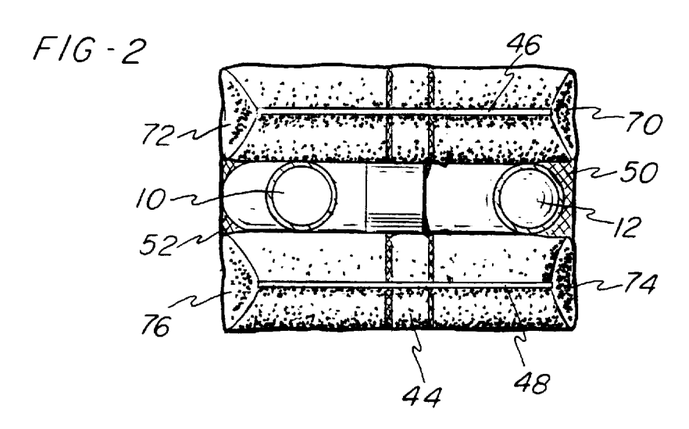
FIG. 2 is a cross-sectional view of the accumulator and adsorbent material package and accumulator fluid flow conduits taken along the plane represented by the lines and arrows 2—2 of FIG. 1.

Turning first to FIG. 1 of the application, there is shown an accumulator 2 of the general type shown and described in U.S. Pat. No. 4,474,035; the disclosure of which is incorporated by reference herein. The accumulator comprises a generally cylindrical housing 4 having a bottom wall 6 leading to a sump area 8. Upstanding fluid flow tubes 10, 12 are provided in the accumulator. A baffle 14 shields direct entry to fluid flow tube 10 as set forth in the aforementioned '035 patent. The fluid flow tubes 10, 12, are connected via a transversely oriented bight tube 16 (see FIGS. 2 and 6).

As per typical operation, inlet bore 100 is in communication with the outlet conduit from an evaporator or the like, with the outlet bore 102 and communicating fluid flow conduit 12 communicating with the suction or inlet side of a compressor unit.

As shown, a sole adsorbent packet 20 is provided toward the bottom of the accumulator, but does not extend into the sump area. In accordance with normal operation, the adsorbent package comprises desiccant or the like material therein that is adapted to dehydrate the fluid medium flowing through the accumulator. Also, a small amount of lubricating oil or the like injected into the system is aspirated into the suction side of the compressor through a filter housing 22 depending from the bight tube 16. The filter comprises a filter medium 23 and support flange 24.

Figure 3:
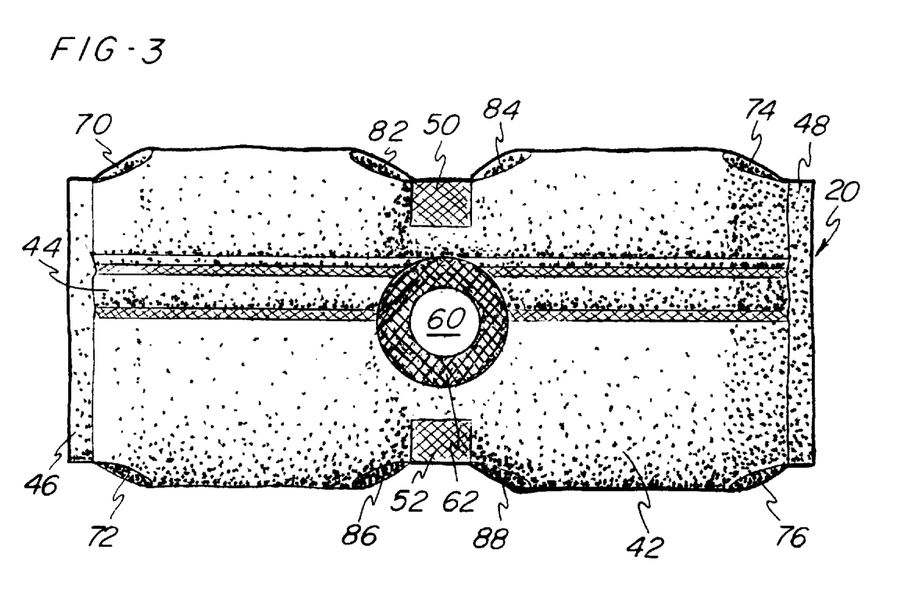
FIG. 3 is a bottom plan view of an adsorbent material package in accordance with the invention.
Figure 4:
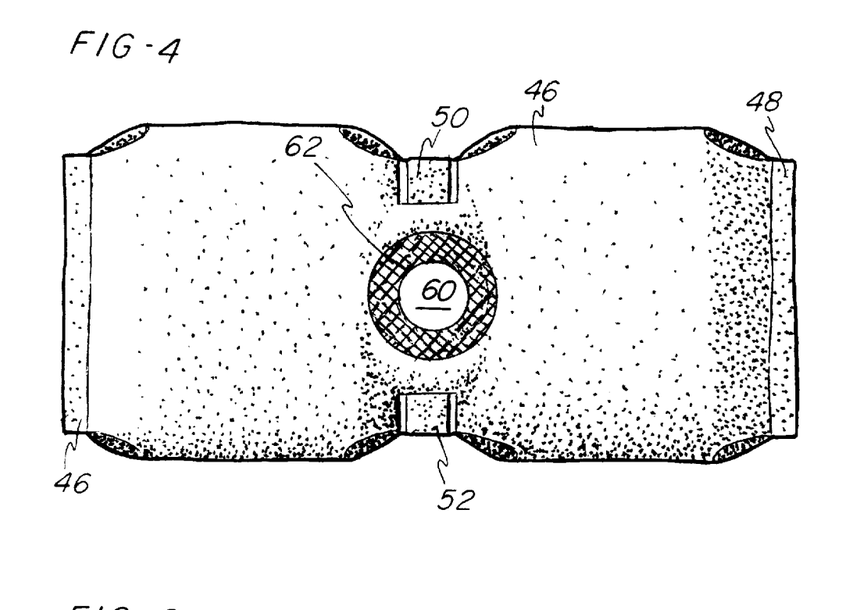
FIG. 4 is a top plan view of the adsorbent material package shown in FIG. 3.

Turning now to FIGS. 3 and 4 there is shown an adsorbent packet 20 in accordance with the invention. First, looking at FIG. 3 specifically, the back side or surface 42 of the packet is shown. Here, the elongated packet material comprises end seams 46, 48, sealing the respective longitudinal ends of the package. A longitudinally extending seam 44 extends longitudinally along the length of the elongated packet and slightly laterally offset from a longitudinally extending bisector line extending through the package. This seam 44 provides a double thickness of the felt like material used to form the packet 20 and therefore can be referred to as a reinforcement area. A circularly cross-sectioned aperture 60 is formed in the middle of the packet and is provided with a rigid heat or ultrasonically fused zone 62 surrounding the aperture. Shoulder members 50, 52 are laterally offset from the aperture 60 and as shown are defined by fused top and bottom surfaces of the packet. Tuck or fold sections 70, 82, 84 and 74 are disposed along the first widthwise edge of the pouch with tuck or folds 72, 86, 88, 76 provided in the opposing or second widthwise edge to define the pouch.

Folds 82, 84 formed in the intermediate portion of the packet cooperate with shoulder 50 along one of the width wise edges of the packet and folds 86, 88 cooperate with shoulder 52 along the opposite width wise edge to provide a narrowed or necked-down width dimension for the packet. This necked down section, located at an intermediate portion along the longitudinal axis of the packet facilitates packet folding. Also, during assembly, the canister housing will readily slide or fit over this reduced width portion.

Although a generally circular aperture is shown in the drawings, the aperture may comprise any one of a myriad of possible cross sectional shapes such as a rectangle, triangle, parallelogram, rhombus, oval, etc. The key criterion is that the aperture should snap or friction fit over the filter flank.

FIG. 4 depicts the top side or surface 64 of the packet 20. Here, aperture 60 is provided with rigid surrounding zone 62. Zone 62 provides a rigid collar which will be snap mounted to the filter support flange 24.

Figure 5:
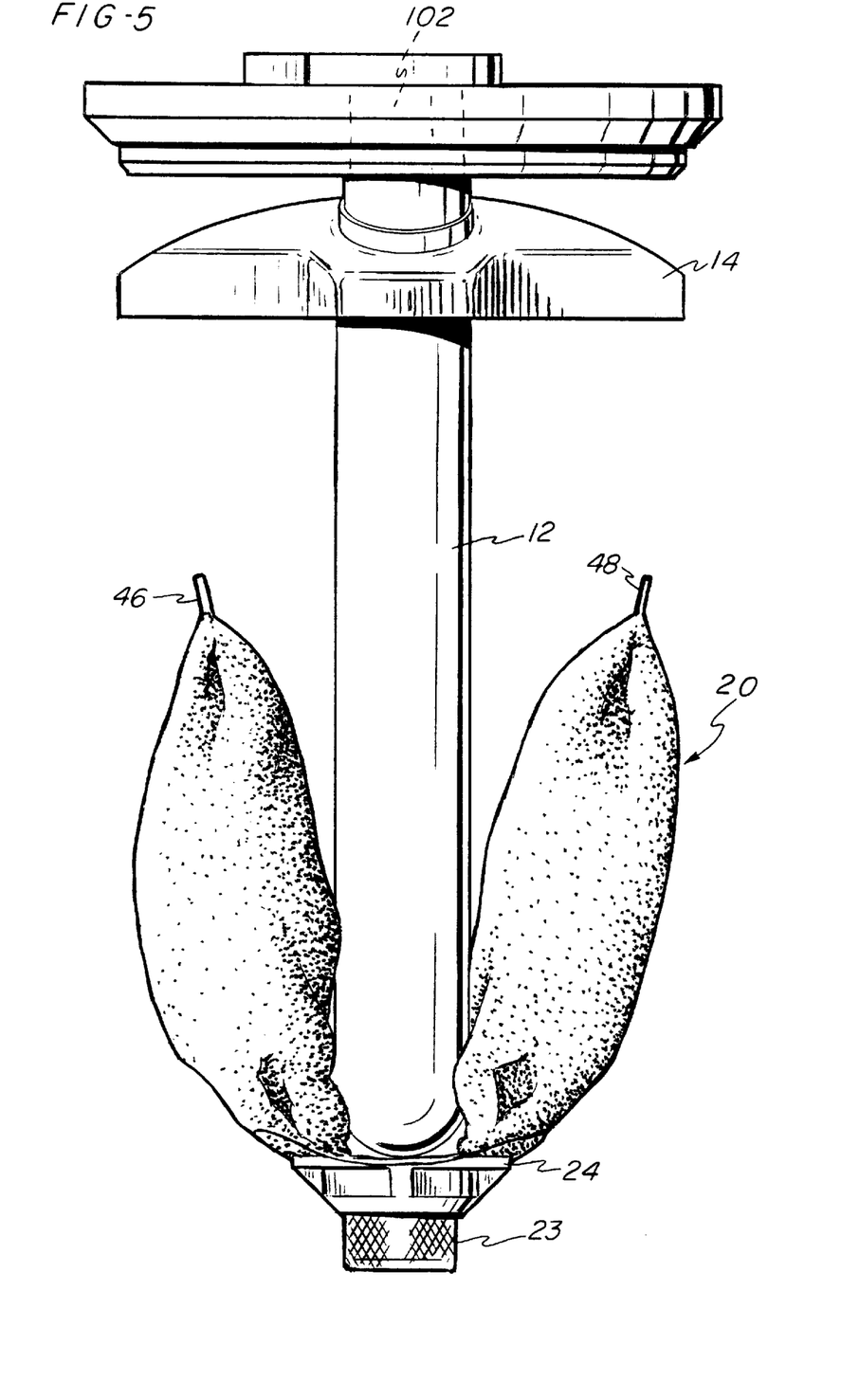
FIG. 5 is another cut away view of the accumulator and adsorbent package shown in FIG. 1 rotated 90° from the position shown in that figure with the accumulator housing omitted for better clarity.
Figure 6:
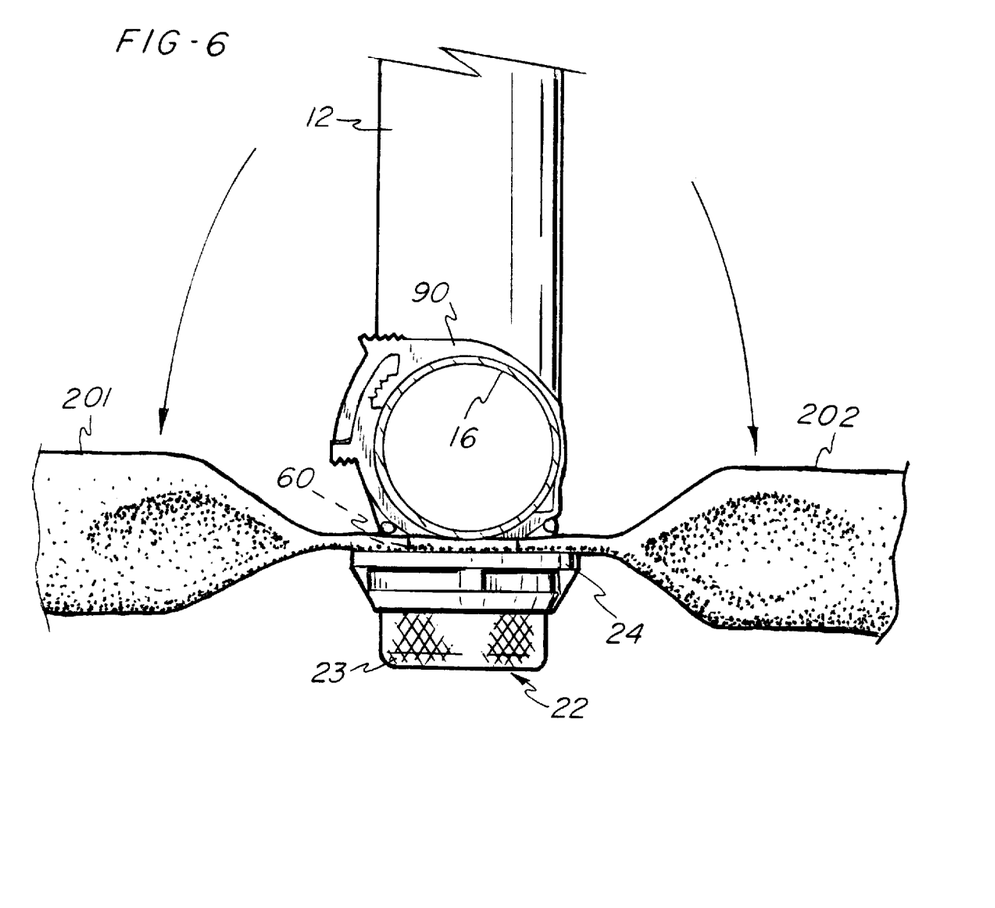
FIG. 6 is a magnified cut away view of the section of the assembly taken along the plane represented by the lines and arrows 6—6 of FIG. 1 with the exception that the lateral ends of the package have been moved downwardly as shown by the arrows to better illustrate the mounting of the adsorbent packet over the filter flange.

The packet is formed from a fibrous, air permeable material such as a synthetic felt material. Polyester felts are presently preferred but other synthetic and natural felts can of course be employed. Turning now to FIGS. 5 and 6, there is shown bight tube 16 with filter housing 22 depending therefrom. The filter is clasped to the bight tube by means of the mounting ring 90 and associated clasp. The aperture 60 is firmly, frictionally received over the support flange 24 of the filter. The opposed lateral sides 201, 202 of the unitary packet will be moved upwardly, against the direction of the arrows (shown in FIG. 6), for proper insertion into the accumulator housing.

The pair of shoulders 50, 52 (see also FIG. 2) along with the rigid collar 62 surrounding the aperture, comprise a centrally located intermediate zone that extends transversely across the length of the packet. This zone provides a rigid, generally flat mounting area for congruent mounting of the bight tube portion therein. This helps provide stability for the adsorbent package during strenuous use conditions commonly encountered. Additionally, and as can be seen best in FIG. 2, the longitudinal seam 44 is parallel and adjacent to the mounting ring 90 of the filter assembly. Due to the rigid nature of the longitudinal seam, this helps to provide increased abrasion resistance of the felt packet in a location in which the ring may tend to shear or rub the packet.

It is therefore apparent that in accordance with the invention, an opening is provided in the unitary package that is snap fit over the filter housing. The opening is surrounded by an annularly shaped rigid zone so as to help maintain stability of the packet over the filter flange. Presently, the diameter of the package aperture 60 is formed so that it is about 0.8–0.9 of the diameter of the flange. One successfully employed package has provided an aperture 60 diameter of about 0.85–0.86 of the flange outside diameter dimension.

In order to make the packet 20 of the present invention, a tubular felted material, as previously described is first provided. The bottom of the pouch like material is then sealed via heat seal, or other electronically sealing system, with ultrasound sealing being preferred. Then, one half of the desired desiccant is filled into the pouch. Appropriate tucks are made in the pouch by holding the desired pouch portions in place by elongated fingers or the like and ultrasonic sealing of the area. The shoulder members and solid rigid zone 62 are then formed via ultrasonic sealing with the second half of the pouch then being filled with desiccant. The top longitudinal edge of the pouch is then sealed so as to provide a sealed packet. At the same time the bottom half of the next succeeding bag in the production run is sealed and the procedure repeated so that successive bags can be made. After each bag is cut, the central aperture 60 is cut in the middle of the zone 62.

Figure 7A:
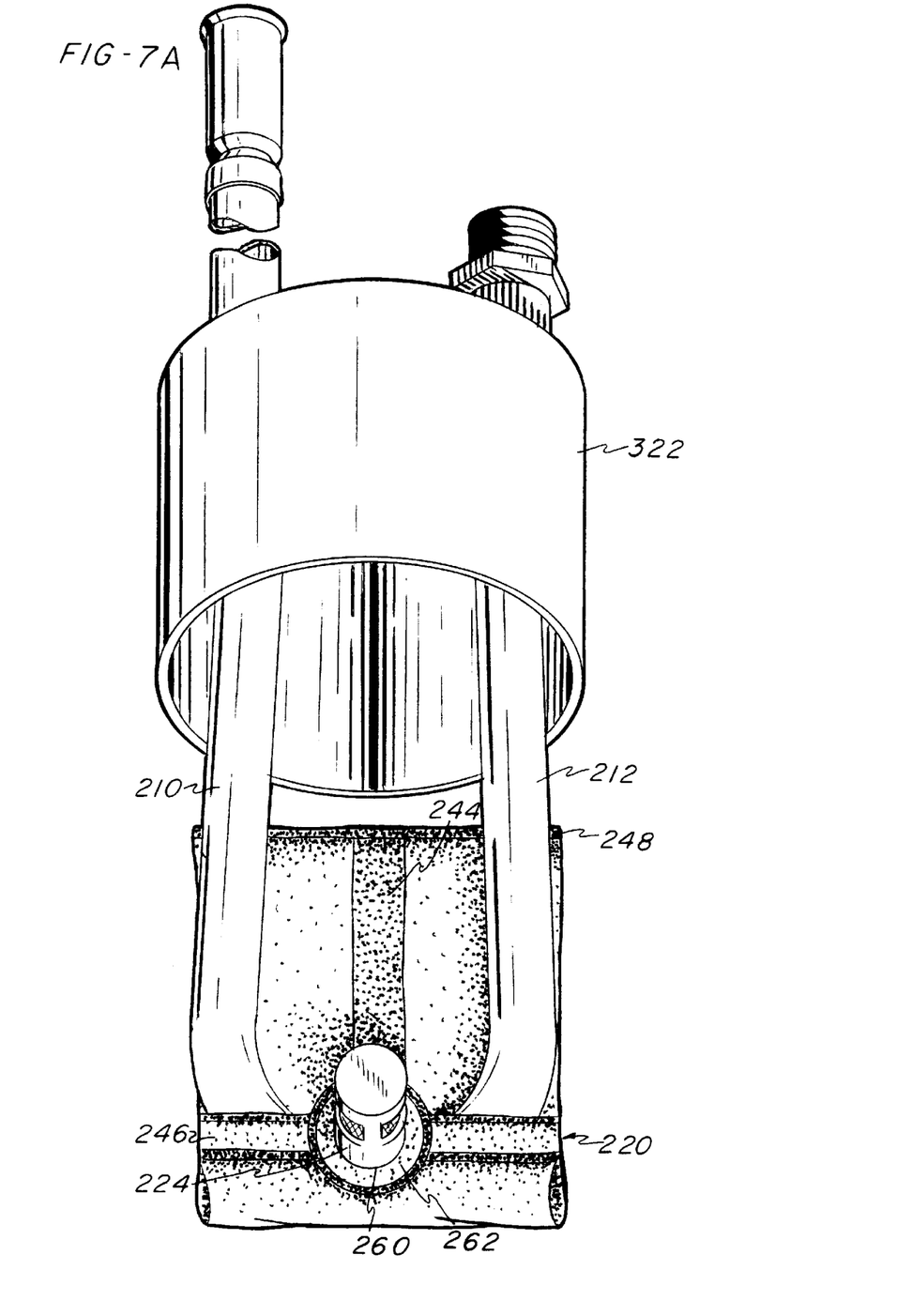
FIG. 7A is a cut away view of an accumulator top incorporating another embodiment of an adsorbent material package in accordance with the invention.

FIG. 7A shows another version of the invention wherein a smaller packet 220 is shown for those cases in which only about 40–50 grams of desiccant is needed. In this figure, the top half 322 of the accumulator housing is shown. This half will be welded or otherwise sealed to a bottom assembly to form the general accumulator housing structure shown in FIG. 1.

Similar to FIG. 1, fluid tubes 210, 212 are connected via a transversely oriented bight section with an aspirator filter housing secured to the bight tube via a ring shaped clasp (not shown). The packet 220 comprises end seams 246, 248 and an aperture 260 provided along one of the longitudinal packet end regions.

The aperture 260 is surrounded by a rigid collar 262 to facilitate snap mount of the packet over the filter flange 224. Similar to the previously described embodiment, a longitudinally extending seam 244 provides a reinforced area that is adapted for positioning adjacent the mounting clasp used to affix the filter to the fluid flow tube.

The provision of a single packet for reception of desiccant therein not only reduces the number of seams and therefore potential rupture sites, but also leads to decreased production time. Additionally due to elimination of connecting seams between bags and the attendant reduced volume areas adjacent these seams, it is possible to place more adsorbent per unit packet length into the single bags in accordance with the invention, thereby shortening the bag's overall length which aids the process of assembling and welding the accumulator can.

Figure 7B:
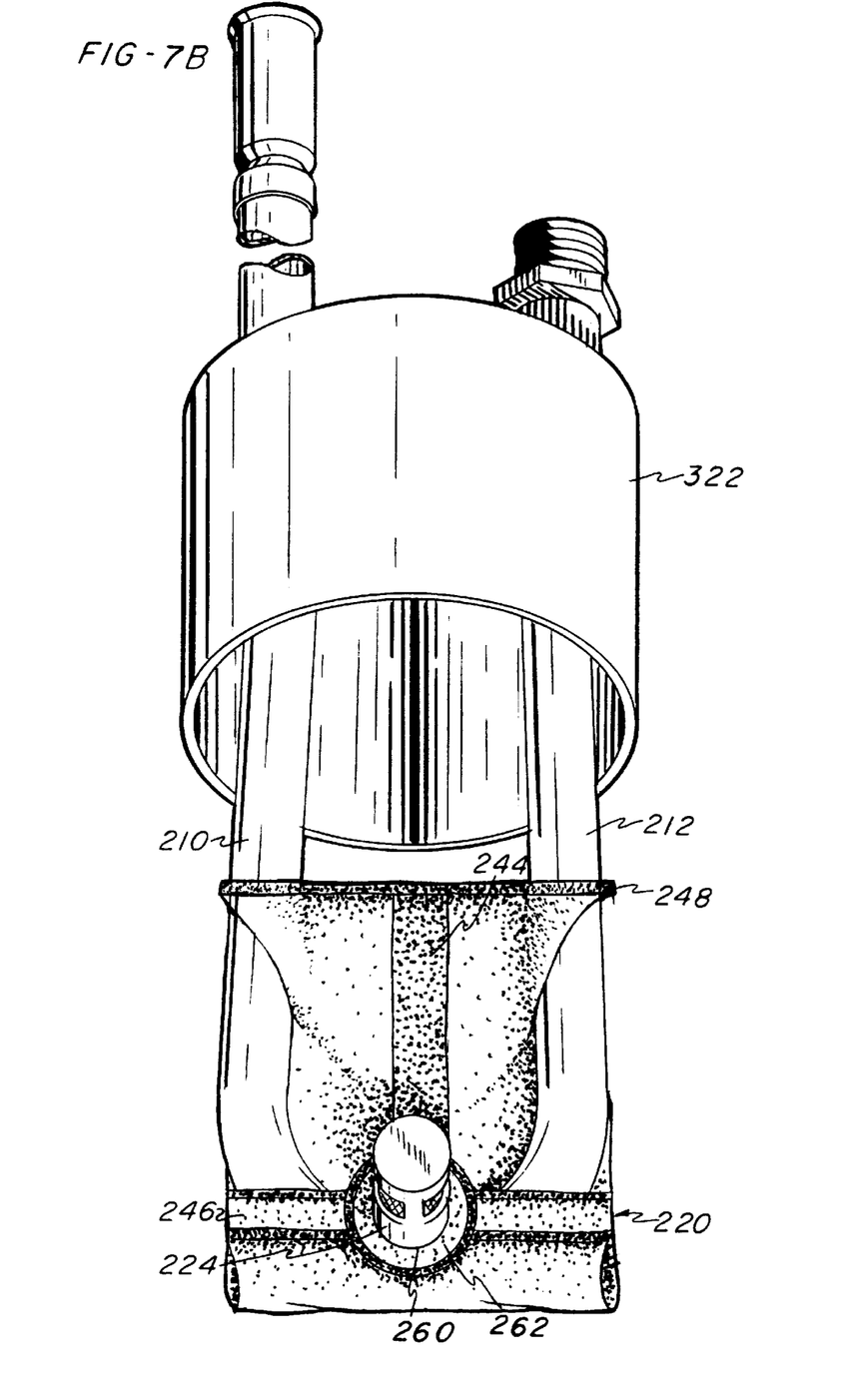
FIG. 7B is a cut away view of the embodiment shown in FIG. 7A, with the end of the package inserted thru the upstanding fluid flow tubes and disposed in front of the plane passing thru those tubes.

FIG. 7B depicts an alternative disposition of the packet 220 shown in FIG. 7A relative to the upstanding fluid flow tubes 210, 212. Here, end seam 248 of the packet has been inserted through the tubes 210, 212 so that, as shown, it is positioned in front of the plane defined by the tubes. In this manner, the end 248 is snugly affixed through the tubes 210, 212 maintaining it in a fixed posture to facilitate assembly of the accumulator housing.

Figure 8:
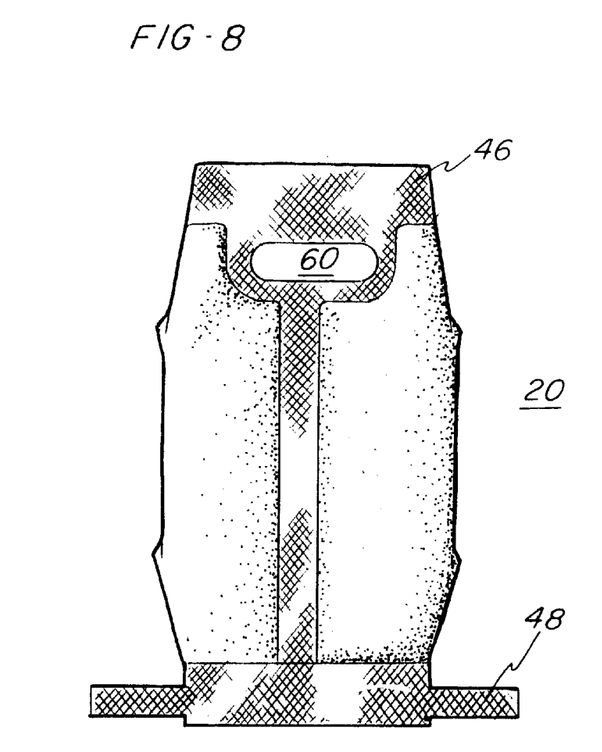
FIG. 8 is a plan view of another embodiment of an adsorbent material package in accordance with the invention.

Another embodiment of the adsorbent packet is shown in FIG. 8 wherein a packet 20 with elongated end seam 48 is depicted. Here, the end seam has a length (extending transversely to the longitudinal dimension of the packet) that is greater than the space between the upstanding fluid flow tubes of the accumulator.

Figure 9:
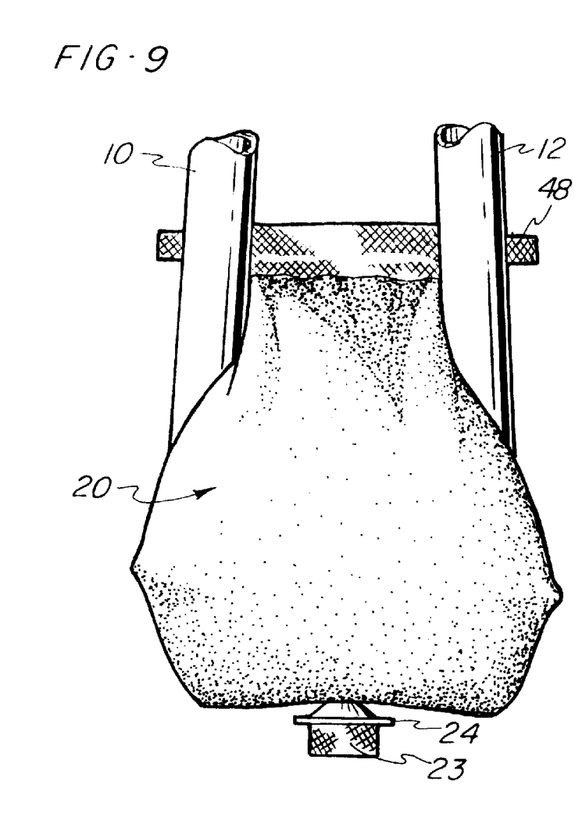
FIG. 9 is a partially cut away cross sectional view showing the adsorbent material package of FIG. 8 mounted to accumulator fluid flow conduits.
Figure 9A:
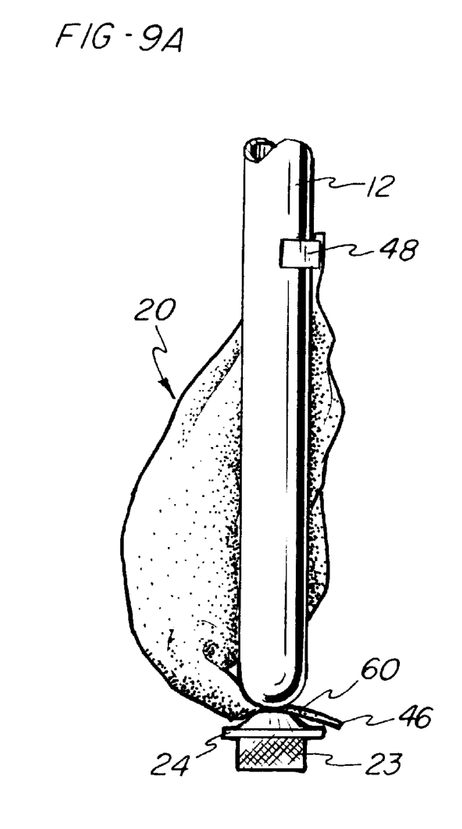
FIG. 9a is a partially cut away cross sectional view of the adsorbent material package and accumulator fluid flow conduits rotated 90° from the position shown in FIG. 9.

As shown best in FIGS. 9 and 9a, the packet is snap fit over the filter. The end seam 48 is force fit or twisted for insertion between the upstanding legs 10, 12 of the accumulator tubes and placed on the far side of the tubes with respect to FIG. 9. Stated differently, end seam 48 is inserted from the front of, and then through the plane defined by the upstanding tubes 10, 12. The packet 20 extends in front of the plane from the snap fit mount 60 upwardly until the end seam 48 spans and grasps the tubes 10, 12 on the rearward side of the plane. When in place, the end seam 48 spans and abuts against the upstanding fluid flow tubes, securely working it in place so that it cannot slip between the tubes.

As shown in FIGS. 8 and 9, the end seam 48, in this embodiment, is composed of the same fibrous material as the packet and is formed as a fusion of the top and bottom surfaces of the fibrous material. The end seam here may be made via ultrasonic welding or other heat sealing techniques provided that an elongated rigid member is formed.

Feeding of the end seam 48 of the packet 20 through the tubes in the accumulator also helps to keep the packet away from the side of the can to provide improved flow and circulation of fluids, oils and gas all the way down to the filter. As previously noted, this disposition of the packet 20 also keeps the packet in concert with the tubes to position it out of the way so that the lid can go on easily in any position, horizontally, side, turned up or down.

Figure 10:
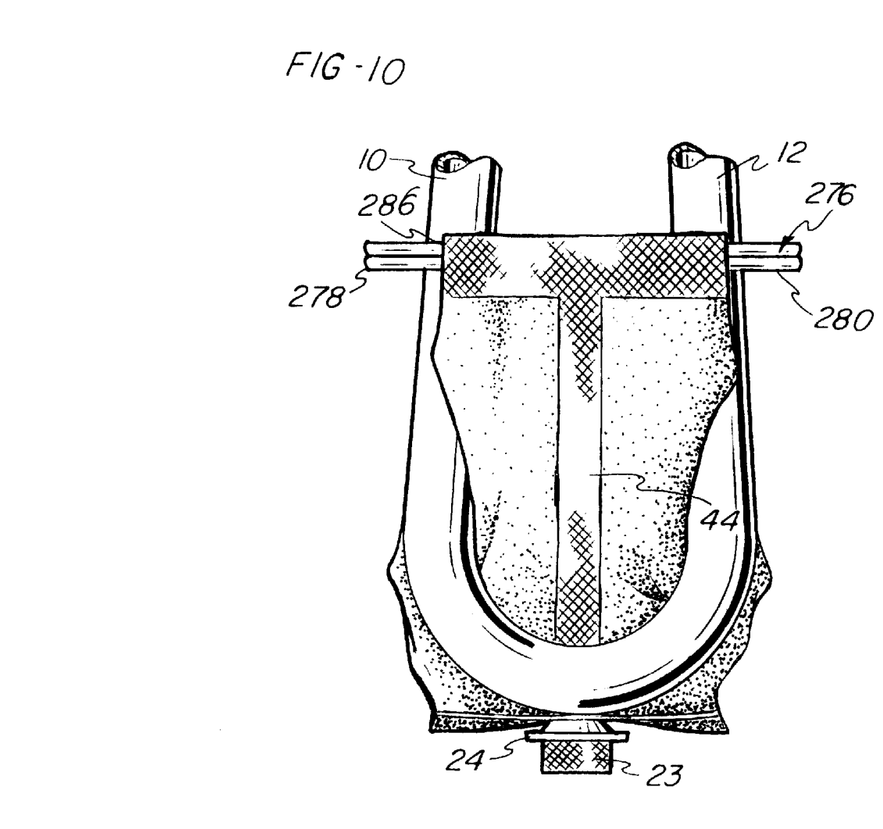
FIG. 10 is a partially cut away cross sectional view similar to that of FIG. 9 but showing another embodiment of an adsorbent material package in accordance with the invention.

Turning now to FIG. 10, there is shown another embodiment of the invention wherein the end seam 48 is provided with a rigid plastic dowel or the like, with the length of the dowel being greater than the width between the upstanding fluid flow tubes in the accumulator. Again, this provides for locking of the dowel (and the packet) through the upstanding fluid flow tubes and along the rearward plane defined by tubes 10, 12 similar to the disposition of the packet as depicted in FIGS. 9 and 9a.

Figure 11:
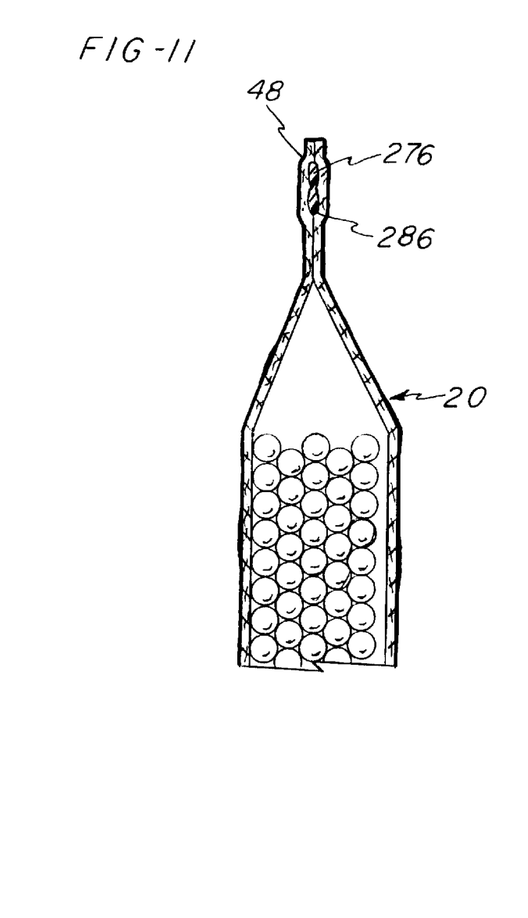
FIG. 11 is a diagrammatical cross sectional view of a portion of the adsorbent material package shown in FIG. 10.

Here, as can be best seen in FIG. 11 the end seam 48 is made with a lumen therein extending transversely to the length of the packet, rigid plastic dowel 276 so inserted through the lumen 286. The dowel may be fixed by being heat set into place by fusion thereof into the end seam material. The respective ends 278, 280 of the dowel extend beyond the width of the upstanding fluid flow tubes (FIG. 10).

Although the dowel has been shown as being inserted through the lumen shown in FIG. 11, the skilled artisan will appreciate that the dowel could be juxtaposed with the end seam and heat or ultrasonically welded thereto.

Figure 12:
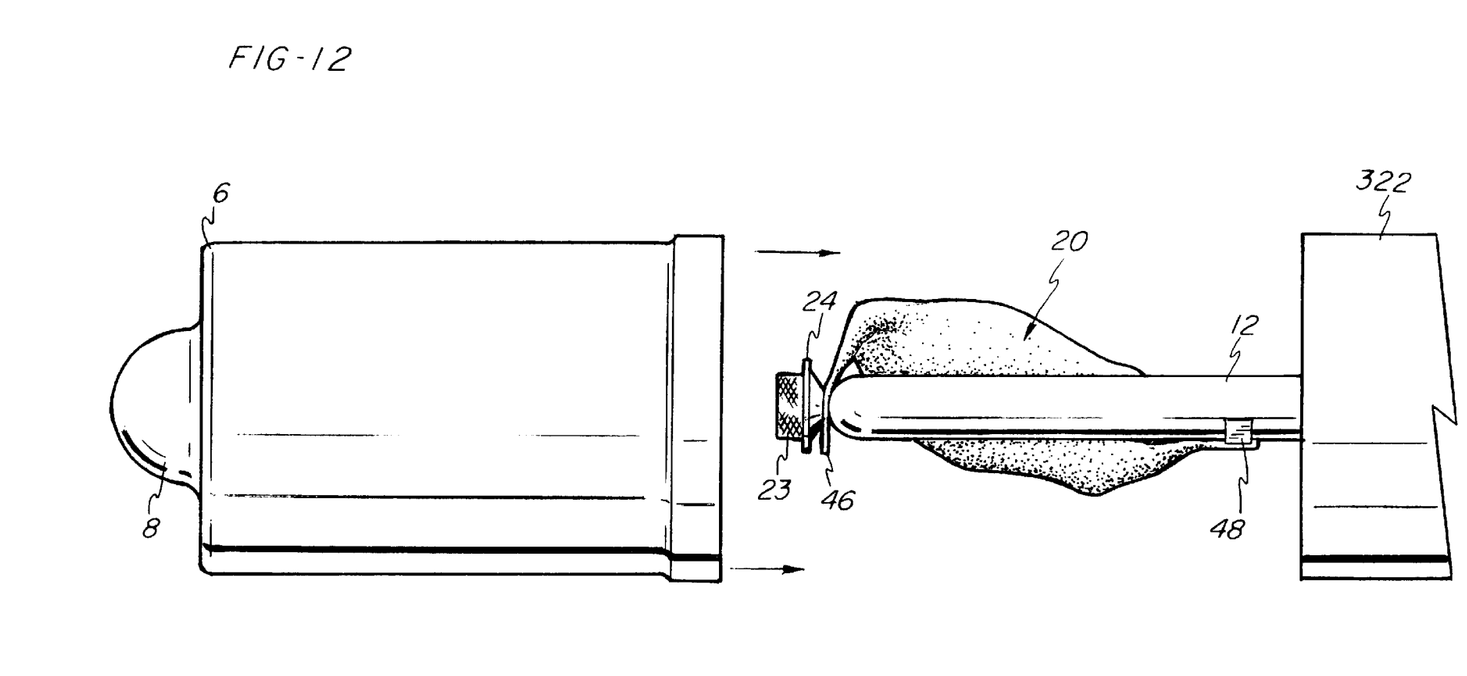
FIG. 12 is a diagrammatic sketch showing assembly of the accumulator canister lid to the other half of the assembly wherein an adsorbent material package of the type shown in FIG. 9 is mounted to the fluid flow conduits.

FIG. 12 depicts another advantage of the packet structures shown in FIGS. 7B and 8–10. During assembly the accumulator can bottom 6 is slid over the tubes 10, 12 to mate with top half 322 of the accumulator housing. Commonly, the bottom 6 and member 322 are fixedly joined via welding, brazing or soldering or the like. Disposition of the packet as shown in this figure, with the end seam 48 extending through the tubes and the end seam 48 spanning the dimension between the tubes, locks the packet in place, facilitating assembly of the canister and helping to space the packet from the sidewalls of the canister. This aids in inhibiting "burn-thru" that sometimes may occur if the packet is in contact with the sidewalls of the canister during the welding or joining of the can parts together.

Figure 13:
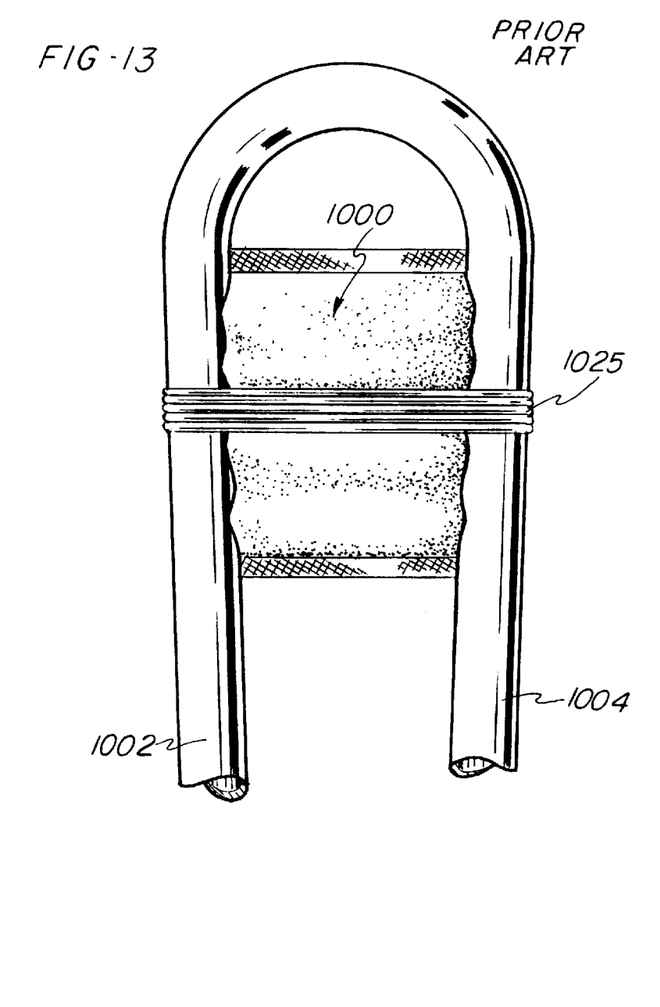
FIG. 13 is a diagrammatic sketch of a prior art adsorbent material package mounted to fluid flow conduits.

This disposition also contrasts to the structure and operations of prior art tie-down type arrangements of the type shown in FIG. 13 wherein prior art package 1000 is tethered to the accumulator tubes 1002, 1004 via wire 1025 or the like. In cases where the tubes are composed of a ductile metal such as Al, the wire can actually bend the tube, interfering with the flow of fluid therethrough.

Figure 14:
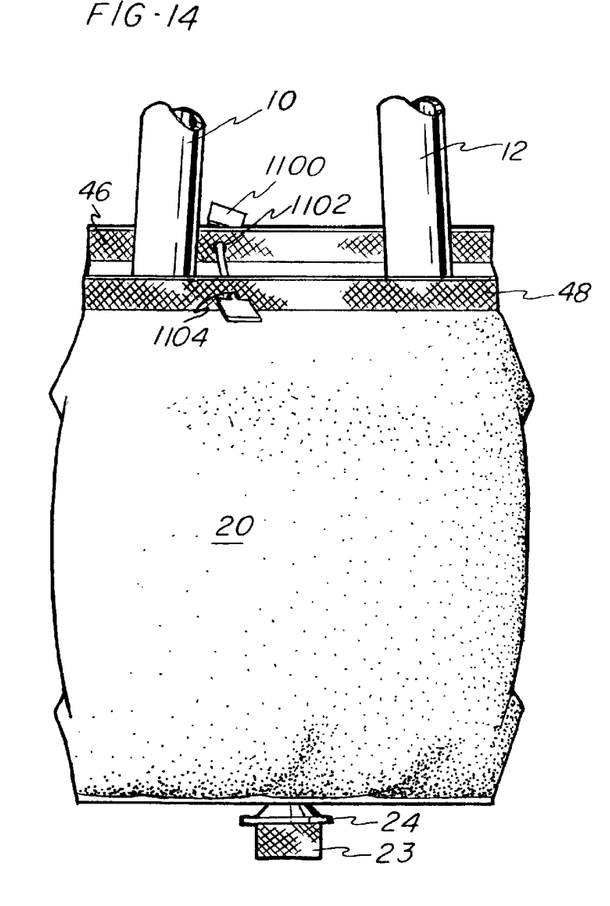
FIG. 14 is a diagrammatic sketch of another embodiment of an adsorbent material package shown securely mounted to accumulator fluid flow conduits.
Figure 15:
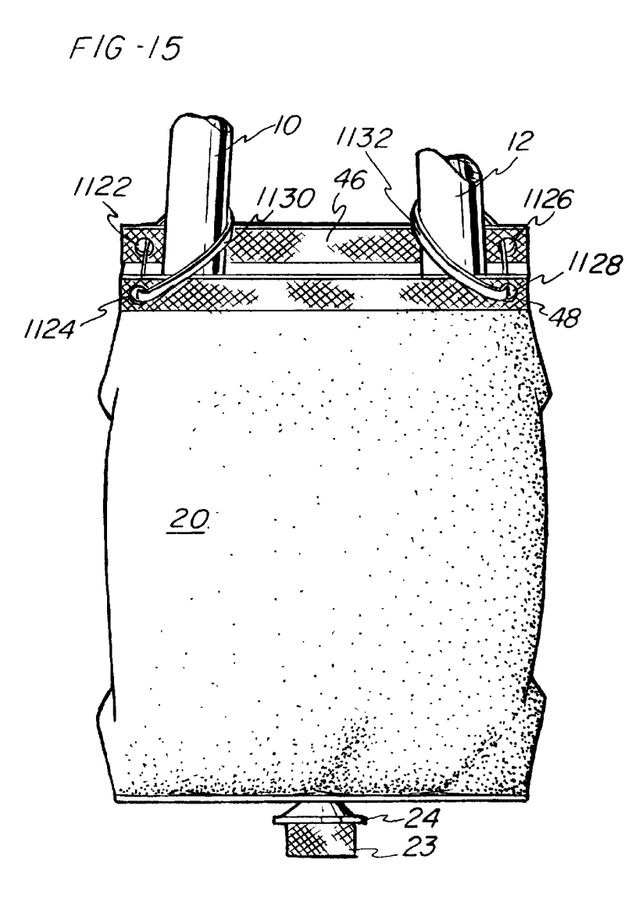
FIG. 15 is a diagrammatic sketch similar to FIG. 14 but showing another embodiment of an adsorbent material package in accordance with the invention mounted to accumulator fluid flow conduits.

A variation on the bags of the type shown in FIG. 3 is shown in FIGS. 14 and 15. Turning first to FIG. 14, the end seams 46, 48 of packet 20 are secured to each other by provision of tie means 1100 such as dog bone ties extending between holes 1102, 1104 formed in the respective end seams 46, 48. Here, the dog bone tie bears against the inside of one of the accumulator fluid flow tubes to help ensure lateral stability of the packet 20 in its position as attached to the tubes. It will be appreciated that another dog bone tie or equivalent arrangement could be made along the inside of the other fluid flow tube shown in this figure.

In the embodiment shown in FIG. 15, another embodiment is shown wherein the end seams 46, 48 are interconnected. Here, the ends of the seams are provided with apertures 1122, 1124, 1126, 1128. Wire ties 1130, 1132 are inserted through matching pairs of these apertures with loops secured around the fluid tubes.

While the forms of apparatus herein described constitute specific embodiments of this invention, it is to be understood that the invention is not limited to these particular embodiments, and that changes may be made therein without departing from the scope of the invention which is defined in the appended claims.

What is claimed is:

1. In a liquid accumulator housed within a generally cylindrical housing and having a pair of parallel spaced, upstanding fluid flow tubes therein connected by a bight portion and a filter housing connected to said bight portion wherein said filter housing includes a filter medium and a mounting flange, said mounting flange positioned intermediate said bight portion and said filter medium;

a unitary adsorbent package having an aperture adapted for fixed, snap fit over said mounting flange to thereby mount said package to said bight portion and space said package from said filter medium, said package comprising an elongated pouch having a longitudinally disposed seam formed therein defining a longitudinally extending reinforced zone, said filter comprising an annular mounting clamp for attaching said filter to said bight portion, said reinforced zone adapted for positioning thereof against said mounting clamp, said absorbant package further comprising a longitudinal axis, and an intermediate zone transversely oriented with respect to said axis and presenting a narrowed width-wise dimension of said package, said aperture located in said intermediate zone.

2. In a liquid accumulator housed within a generally cylindrical housing and having a pair of parallel spaced, upstanding fluid flow tubes therein connected by a bight portion and a filter housing connected to said bight portion wherein said filter housing includes a filter medium and a mounting flange, said mounting flange positioned intermediate said bight portion and said filter medium;

a unitary adsorbent package having an aperture therein adapted for fixed, snap fit over said mounting flange to thereby mount said package to said bight portion and space said package from said filter medium, said adsorbent package further comprising an end seam located at a longitudinal end of said packet and disposed transversely to a longitudinal axis of said package, said end seam having a length extending transverse to said longitudinal axis, wherein said upstanding fluid flow tubes have a distance therebetween, said length of said end seam being greater than said distance between said upstanding fluid flow tubes whereby said end seam is adapted for insertion through said upstanding fluid flow tubes and secure abutment of said end seam against said upstanding fluid flow tubes.

3. Adsorbent package as recited in claim 2 wherein said end seam is formed of a stiff material.

4. Adsorbent package as recited in claim 3 wherein said stiff material is a fused portion of said package.

5. Adsorbent package as recited in claim 2 wherein said end seam further comprises an elongated dowel.

6. Adsorbent package as recited in claim 5 wherein said end seam comprises a lumen formed therein and extending transversely to said longitudinal axis, said dowel inserted in said lumen.

7. In a liquid accumulator housed within a generally cylindrical housing and having a pair of parallel spaced, upstanding fluid flow tubes therein connected by a bight portion and a filter housing connected to said bight portion wherein said filter housing includes a filter medium and a mounting flange, said mounting flange positioned intermediate said bight portion and said filter medium;

a unitary adsorbent package having an aperture therein adapted for fixed, snap fit over said mounting flange to thereby mount said package to said bight portion and space said package from said filter medium, wherein said package comprises an elongated pouch having a longitudinal axis, first and second end seams formed at respective longitudinal ends of said package, said end seams adapted for positioning along opposing sides of said upstanding fluid flow tubes, said end seams comprising attachment means for attaching said ends together.

8. Adsorbent package as recited in claim 7 wherein said attachment means comprise apertures formed in said end seams and tethering means disposed through said apertures.

9. Adsorbent package as recited in claim 8 wherein said tethering means comprise a wire.

10. Adsorbent package as recited in claim 8 wherein said tethering means comprises a tie.

11. An adsorbent containing packet adapted for positioning over a bleed filter attached to a fluid flow conduit, said packet comprising an elongated pouch having a top surface and a bottom surface, a longitudinally extending reinforcement member extending along said bottom surface, a pair of end seams sealing respective longitudinal ends of said pouch, an aperture extending through said pouch and dimensioned for snap fit engagement over said filter, and a pair of shoulder members, each of said shoulder members extending in a transverse direction with respect to said longitudinally disposed seam, said aperture located between said pair of shoulder members, wherein said shoulders and said aperture are positioned at an approximate midpoint between said pair of end seams, wherein each of said shoulder members define a narrowed width-wise dimension of said packet.

12. Packet as recited in claim 11 wherein each said shoulder comprises a fused section fusing said top surface and said bottom surface of said packet together.

13. Packet as recited in claim 11 wherein said aperture is centrally located on said packet.

14. An adsorbent containing packet adapted for positioning over a bleed filter attached to a fluid flow conduit, said packet comprising an elongated pouch, said pouch having a longitudinal axis, a pair of end seams sealing respective longitudinal ends of said pouch, an aperture extending through said pouch and dimensioned for snap fit engagement over said filter, an intermediate zone of said pouch transversely oriented with respect to said axis and presenting a narrowed width-wise dimension of said packet, said aperture located in said intermediate zone.

15. In a liquid accumulator disposed within a housing and having a pair of spaced upstanding fluid flow tubes therein connected by a bight portion with a filter located along said bight portion, and an imaginary plane passing through said upstanding fluid flow tubes, an adsorbent package having an end portion, an aperture in said package, said aperture adapted for engagement over said filter;

said package adapted for extending upwardly in front of said plane at a first portion of said package proximate said aperture and behind said plane at said end portion, said end portion comprising grasping means for securing said packet against said upstanding fluid flow tubes at a location behind said imaginary plane.

16. Adsorbent package as recited in claim 15 wherein said grasping means comprises at elongated end seam, said end seam having a width greater than the distance between said upstanding fluid flow tubes.

17. Adsorbent package as recited in claim 16 wherein said elongated end seam comprises a stiff, fused section of said package.

18. Adsorbent package as recited in claim 15 wherein said grasping means comprises a dowel secured to said end portion, said dowel having a length greater than the distance between said upstanding fluid flow tubes, said dowel adapted for abutting said upstanding fluid flow tubes at said location behind said imaginary plane.

19. Adsorbent package as recited in claim 18 further comprising a lumen formed in said package, said dowel inserted through said lumen.

20. In a liquid accumulator disposed within a housing and having a pair of spaced upstanding fluid flow tubes therein connected by a bight portion with a filter located along said bight, an adsorbent package having first and second end portions, and an aperture located between said end portions adapted for engagement over said filter, said package adapted for extending upwardly along said fluid flow tubes from said filter with said first and second end portions of said package adapted for positioning on different sides of said pair of fluid flow tubes, said package further comprising securing means for securing said first and second ends together.

21. Adsorbent package as recited in claim 20 wherein said first and second end portions each comprise a rigid fused portion of said package.

22. Adsorbent package as recited in claim 20 wherein said securing means comprise apertures formed in said first and second end portions and wires extending through said apertures.

23. Adsorbent package as recited in claim 20 wherein said securing means comprise apertures formed in said first and second end portions and a dog bone tie extending through said apertures.

* * * * *